No. 738,151. Patented September 8, 1903.

UNITED STATES PATENT OFFICE.

ALBERT E. BERRY, OF STRATFORD, ENGLAND, ASSIGNOR TO A. BOAKE ROBERTS & CO., LIMITED, OF STRATFORD, ENGLAND.

FINING.

SPECIFICATION forming part of Letters Patent No. 738,151, dated September 8, 1903.

Application filed February 13, 1902. Serial No. 93,970. (No specimens.)

*To all whom it may concern:*

Be it known that I, ALBERT EUSTACE BERRY, a citizen of England, residing at 101 Carpenters road, Stratford, in the county of Essex, England, have invented a certain new and useful Improvement in Finings, (for which application has been made for a patent in Great Britain, dated September 21, 1901, No. 18,874,) of which the following is a specification.

For many years an excellent fining material for beer, wine, and other fermented liquors has been manufactured from isinglass in the form of an emulsion in a slightly-acid liquid, taking six to eight weeks to prepare, as is well known to brewers and fining manufacturers, and was first described by Coleman. (British specification No. 799 of 1865.) By the term "isinglass" is here meant the dried swimming-bladders of various fishes and the substance of the same chemical properties which exists in most fish-skins. Such an emulsion has hitherto been preserved by some suitable antiseptic and has been transported in cold or temperate climates, but not in warm climates, because by lengthened exposure to a temperature of 70° to 80° Fahrenheit and upward, such as is normal in hot countries, the isinglass passes into gelatin, which, as is well known, is useless as a fining material for beer or white wine. (Compare Allen's *Commercial Organic Analysis,* second edition, Vol. IV, pages 476, 477.)

The present invention relates to the production from the said emulsion of isinglass of a concentrated extract consisting of isinglass in a form in which it may be exposed to warm climates without conversion into gelatin and may be readily again emulsified. For this purpose the original emulsion is mixed with five to ten per cent. of its weight of common salt (sodium chlorid) and the mixture is allowed to rest for a few hours, in which time the isinglass is precipitated. Other salts, such as sodium sulfate, are capable of precipitating isinglass from the emulsion and for the purpose of this invention are equivalent to sodium chlorid. The precipitate is separated from the liquid by filtration or otherwise and pressed into cakes, slabs, or tablets until it is of the desired degree of dryness. To use this cake as a fining material, it is only necessary to steep it for a few hours in cold water and then to add sufficient cold water to bring it to an emulsion of the proper density. For example, if the cake contain about 40 per cent. of water it may be soaked in about five times its weight of cold water first, and after twelve hours twenty times its weight of water may then be added, the whole being well mixed. When water to the above extent of forty per cent. is left in the cake, some preservative or antiseptic should be added to the isinglass precipitate. It is also advantageous to add some solid acid, like boric acid, tartaric acid, or citric acid, to the precipitate before it is pressed, particularly if it is to be hard pressed, as such acid aids the subsequent emulsification of the cake. Boric is preferable because of its preservative qualities, as then no other antiseptic need be used. It is obvious that the cost of transporting this concentrated fining material is less than that of transporting the emulsion ready for use, and it is a great advantage that the material can pass through a hot climate without change.

Having thus described the nature of this invention and the best means I know of carrying the same into practical effect, I claim—

1. The method of treating emulsions of isinglass to prevent the hydrolysis of the isinglass and to prepare a readily-emulsifiable product, which consists in precipitating the isinglass from the emulsion by means of a salt, and pressing the precipitate.

2. The method of treating emulsions of isinglass to prevent the hydrolysis of the isinglass and to prepare a readily-emulsifiable product, which consists in precipitating the isinglass from an acid emulsion by means of a salt, and pressing the precipitate.

3. As a new article of manufacture, a cake of pressed precipitated isinglass, distinguished by its indistinctly fibrous character, and its property of emulsifying readily with cold water.

4. As a new article of manufacture, a cake consisting of pressed precipitated isinglass and a solid acid.

5. As a new article of manufacture, a cake consisting of pressed precipitated isinglass, a preservative and a solid acid.

In testimony whereof I have hereunto set my hand in presence of two subscribing witnesses.

A. E. BERRY.

Witnesses:
 WALTER I. SKERTEN,
 GERALD L. SMITH.